UNITED STATES PATENT OFFICE 2,561,510

DISUBSTITUTED THIOUREA COMPOUNDS

Frederick G. Hess, Merchantville, N. J., assignor, by mesne assignments, to Cities Service Research and Development Company, New York, N. Y., a corporation of New Jersey No Drawing. Application October 22, 1946, Serial No. 704,988

10 Claims. (Cl. 106—239)

This invention relates to organic compounds and is more especially concerned with the preparation of a group of new substituted thiourea resins.

I have discovered that primary rosin amines may be reacted with carbon disulphide to yield symmetrically disubstituted thiourea compounds which show high promise as synthetic resins for a number of purposes. This reaction has been carried out with both saturated and unsaturated types of amines, having the following structural formulas:

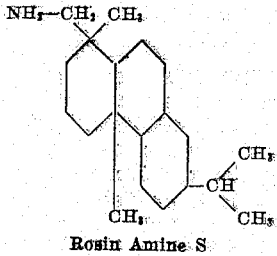

Rosin Amine S

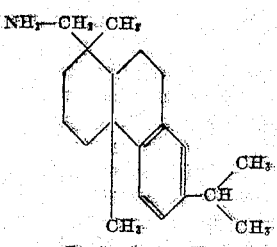

Rosin Amine D

The end product which is obtained with either of these starting materials is a clear, light amber colored resin which is a non-tacky solid at ordinary temperatures, melts at around 200° F., is wholly insoluble in water, and yet may readily be dissolved in such common solvents as Stoddard, naphtha, gasoline, ethanol, benzol, and the like. It is of further note that these resins have excellent covering power, forming highly tenacious films which are capable of excluding both water and air, and have other properties which fit them for use in the sizing of paper, the preparation of protective coating compositions for metal, and for other uses.

The nature of the new resins, their more important physical characteristics, and at least one method by which they may be prepared will be illustrated in the following examples.

Example I

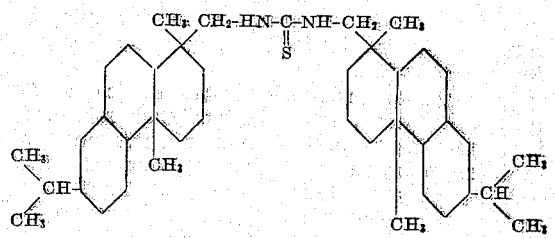

This compound was prepared by the reaction of two mols of saturated rosin amine obtained from Hercules Powder Company under the name "Rosin Amine S," with one mol of carbon disulphide. Thus, 100 grams of the amine was dissolved in about 200 cc. of toluene, in an open flask, 10 cc. of carbon disulphide representing about one mol plus ten per cent excess was added, and the solution was heated under a reflux condenser to split off hydrogen sulphide and yield the desired di-substituted thiourea compound. As a matter of convenience, the hydrogen sulphide was absorbed in a sodium hydroxide solution, and when its elimination appeared complete at the end of about three and one-half hours, refluxing was discontinued and the solution was allowed to cool. For precautionary reasons, the cooled solution was given a washing with sodium hydroxide solution, and a further washing with water, to eliminate any residual traces of hydrogen sulphide. Following that treatment, the toluene was distilled off, leaving a residue of about 99.5 grams molten resin which was poured into a shallow pan for solidification.

The finished product proved to be a clear, light amber colored resin which is fairly hard and brittle at ordinary temperatures, having a melting point of about 190°–195° F., a specific gravity at 77° F. of 1.035, and a sulphur content of approximately 4.45 per cent by weight as compared with a theoretical content of 4.64 per cent. It is of particular note that the resin is insoluble in water, readily dissolves in petroleum naphtha, Stoddard Solvent and gasoline, in ethyl alcohol and benzol, and in other inexpensive and readily available commercial solvents.

Example II

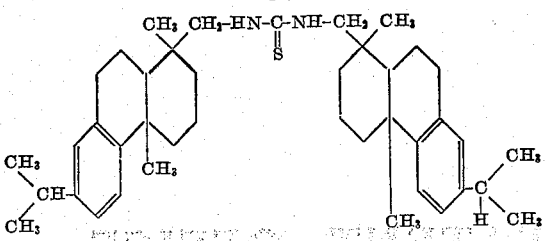

The starting material for this thiourea resin was a dehydrogenated rosin amine supplied by Hercules Powder Company under the name "Rosin Amine D." In carrying out this reaction, 400 grams (two mols) of the amine was dissolved in 900 cc. of xylene, 40 cc. (one mol plus ten per cent excess) of carbon disulphide was added, and the resulting solution was refluxed for about six hours to split off hydrogen sulphide and form the desired di-substituted thiourea compound. The heating of the solution under reflux conditions appeared to result in complete elimination of the hydrogen sulphide, this off-gas being absorbed in sodium hydroxide solution as a matter of convenience, so as to make unnecessary any final caustic soda or water washing. Upon completion of the reaction, the xylene was distilled off, leaving a residue of about 427 grams of molten thiourea resin which was poured off into a shallow pan for solidification.

The finished product was again a clear and fully transparent, light amber colored resin, having a fair degree of hardness and brittleness at ordinary temperatures, melting point of about 220–224° F., a specific gravity at 77° F. of 1.054, and a sulfur content of 4.82 in contrast to the theoretical content of 4.72 for the pure compound having the structural formula given above. The solubility of this resin appeared to be substantially identical with that of the compound described in Example I. Thus the unsaturated resin is not appreciably soluble in water, but may readily be dissolved in petroleum naphtha, Stoddard Solvent, kerosene, gasoline, ethyl alcohol, benzol and the like.

Example III

It will be appreciated that the toluene and xylene employed in carrying out the reactions described in Examples I and II served only as diluents to facilitate the handling of the very small quantities of active ingredients which were involved. Obviously any suitable solvent may be employed in preference to those which have been mentioned. Thus, I have reacted saturated rosin amine and carbon disulphide in Stoddard Solvent to obtain a resin corresponding in all respects to that described under Example I. On the other hand, when the quantities of active ingredients represent a sufficient bulk to be conveniently handled, the reaction may be carried out directly and without the presence of an intervening solvent.

Example IV

The resins of both the saturated and unsaturated types have excellent covering power and a high degree of adhesion for glass and porcelain, for aluminum, steel, and other common metals, and for paper and the like. These characteristics, together with substantially complete water insolubility and other properties, tend to fit the compounds for use as protective coatings, sizings, and the like. Thus I have found that coatings of my thiourea resins suffice to protect aluminum and steel from atmospheric corrosion for periods ranging from a few weeks to possibly as much as a year or more, depending upon the depth to which the surface is covered. For metal coating work I prefer to use thin solutions of the resins which may readily be applied by brush or spray to obtain complete coverage of the surface which is to be protected. Thus, a ten per cent solution of either the saturated or unsaturated resin in Stoddard Solvent flows easily, and upon evaporation of the solvent carrier, leaves a continuous film of the resin which will serve to protect steel and aluminum from atmospheric corrosion for a period of several weeks. The somewhat thicker coatings which are deposited from a twenty per cent concentration of the resins in this volatile solvent provides very much greater protection for materially longer periods of time. Thus I have found that such a coating will remain unbroken, neither checking nor cracking under extreme temperature changes, and completely protecting the brightly polished surfaces of steel and aluminum strips for many months of outdoor weathering, while laboratory tests indicate that it should afford full protection for about a year. Compositions containing up to as much as fifty per cent of the foregoing thiourea compounds have proven to be thin enough for easy application, and the resulting coatings give every evidence of affording even longer lasting protection than the twenty per cent solutions.

It will be evident of course that the coating compositions may be prepared simultaneously with the making of the resin itself. I have, for example, reacted carbon disulphide with the rosin amine compound in solution in Stoddard Solvent to yield a final solution of about forty per cent by weight which has proven entirely satisfactory for direct use as a coating composition. Obviously, however, if a thinner or thicker solution is wanted, it is only necessary to adjust the proportion of Stoddard Solvent used during preparation, or to add to or distill off an appropriate amount of Stoddard Solvent for this solution.

It will be apparent that the described compositions have the virtues of low solvent cost, fairly high volatility, and a flash point which is high enough to avoid undue fire hazard. Obviously, however, any other suitable solvent may be employed as the resin carrier in preparing compositions having a viscosity, a resin control, a volatility and other characteristics which may be needed to meet the requirements of special cases.

Coatings of either of my new resins adhere well to the common metals of construction, are completely waterproof, give no evidence of cracking, checking or lifting on long continued outdoor exposure, and are otherwise well qualified to protect the common metals of construction against the effects of even very highly corrosive industrial atmospheres. They have the additional, and probably not entirely obvious virtue of being extremely easy to remove whenever that becomes necessary. Thus, a simple washing of the resin coated surfaces with Stoddard Solvent, kerosene, cleaner's naphtha, gasoline or the like, effectively removes substantially all traces of the coating material, leaving a clean surface which is ready for such other treatment as may be in contemplation. This ease of removal is so obviously a factor of major importance in a wide variety of circumstances as hardly to require more than the merest mention.

Having described my new compounds and one, though not necessarily the only method by which they may be prepared, what I claim as new and useful is:

1. A thiourea having the formula

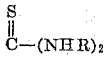

where R is a radical selected from the group consisting of hydroabietyl and dehydroabietyl.

2. 1,3-bis(hydroabietyl)-2-thio-urea.

3. 1,3-bis(dehydroabietyl)-2-thio-urea.

4. The method of producing a synthetic resin comprising reacting carbon disulfide with a primary amine selected from the group consisting of hydroabietylamine and dehydroabietylamine and heating the resulting reaction product to split off hydrogen sulfide and yield a disubstituted thiourea compound.

5. The method of producing a synthetic resin comprising reacting carbon disulfide with a primary amine having the formula:

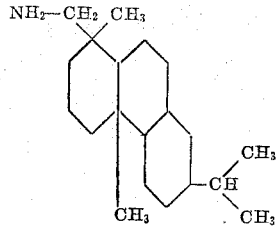

and heating the resulting reaction product to split off hydrogen sulfide and yield a disubstituted thiourea compound.

6. The method of producing a synthetic resin comprising reacting carbon disulfide with a primary amine having the formula:

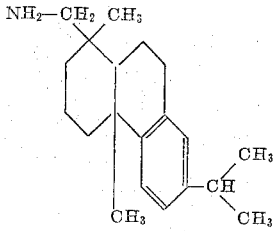

7. A coating composition for protecting metals consisting essentially of from 10 to 50 per cent by weight of a thiourea compound of claim 1 dissolved in a volatile solvent.

8. A coating composition for protecting metals consisting essentially of about 20 per cent by weight of a thiourea compound of claim 1 dissolved in Stoddard Solvent.

9. A coating composition for protecting metal surfaces consisting essentially of about 20 per cent by weight of a thiourea compound of claim 1 dissolved in a volatile solvent.

10. A coating composition for protecting metal surfaces consisting essentially of about 20 per cent by weight of a thiourea compound of claim 1 dissolved in Stoddard Solvent.

FREDERICK G. HESS.

No references cited.